United States Patent [19]

McGuire et al.

[11] Patent Number: 5,435,517
[45] Date of Patent: Jul. 25, 1995

[54] SWING ARM BRACKET ASSEMBLY

[75] Inventors: O. Daniel McGuire, Radford; Norman L. Kopp; Gerald W. Brown, both of Christiansburg, all of Va.

[73] Assignee: Kollmorgen Corporation, Waltham, Mass.

[21] Appl. No.: 105,744

[22] Filed: Aug. 12, 1993

[51] Int. Cl.⁶ ............................................. F16M 1/00
[52] U.S. Cl. ...................................... 248/637; 248/674
[58] Field of Search ............... 248/637, 674, 580, 575, 248/608

[56] References Cited

U.S. PATENT DOCUMENTS

| 3,730,463 | 5/1973 | Richard | 248/580 |
|---|---|---|---|
| 3,966,052 | 6/1976 | Kraus | 211/129 X |
| 4,718,420 | 10/1988 | Greenberg | 248/637 |
| 5,310,034 | 5/1994 | Bernabei | 248/674 X |

FOREIGN PATENT DOCUMENTS 0374106  6/1990  European Pat. Off. .

Primary Examiner—Ramon O. Ramirez
Assistant Examiner—Korie H. Chan
Attorney, Agent, or Firm—Morgan & Finnegan

[57] ABSTRACT

A swing arm bracket assembly includes a shaft having a plurality of journals. One end of the shaft connects to a motor drive shaft. Each journal of the shaft has a bearing thereon and is of approximately the same axial length as the bearing. A support member is provided which connects on one end to a machine and on the other end connects to the motor. The support member also rotatably engages at least one of the bearings on the shaft. A swing arm is provided having an arm portion and a cylindrical sleeve portion extending axially through the support member. The cylindrical sleeve portion rotatably engages at least one of the bearings on the shaft.

7 Claims, 5 Drawing Sheets

SWING ARM BRACKET ASSEMBLY

BACKGROUND OF THE INVENTION

This invention relates to swing arm bracket assemblies for automated machinery. More particularly, this invention relates to swing arm bracket assemblies for automated letter sorting machines.

FIG. 1 shows a conventional swing arm bracket assembly 10 as installed in a letter sorting machine. The swing arm bracket assembly includes bracket 12, swing arm 14, and top plate 16. Shaft 18 extends through the swing arm bracket assembly and is coupled at one end to servo motor 20 by keyed coupling 22. Shaft 18, on its other end, and idler shaft support 24 on swing arm 14 have compound pulleys 28 attached thereto on which rubber belts 30 are driven. Idler shaft support 24 is positioned on swing arm 14 by belt adjustment bolt 26. In operation, independently rotatable swing arm 14 is tensioned against a letter stack to create friction between the rubber belts and the letters. This tension is provided by helical extension spring 32 which attaches to spring post 34 on the swing arm bracket assembly.

FIG. 2 shows a top view of the conventional swing arm bracket assembly. Top plate 16 is attached to bracket 12 by socket screws 36. Additionally, to insure true alignment of the top plate and bracket, hardened straight pins 38 are provided. Mounting holes 40 are provided in bracket 12 for attachment of the servo motor to the bottom thereof. Swing arm 14 has oblong holes 42 and through holes 44 for attachment and positioning, respectively, of idler shaft support 24 (shown in FIG. 1.)

FIG. 3 is a partial side sectional view of the swing arm bracket assembly of FIG. 2 taken along line 3—3. Shaft 18 includes lesser diameter portion 46 and greater diameter portion 48. Collar 50 is provided around the lesser diameter portion of the shaft where the shaft extends through top plate 16. Below collar 50 is bearing 52 which is press fit onto lesser diameter portion 46 of shaft 18 and is positioned in bearing bore 54 of top plate 16. This bearing is typically General Bearing Part No. 6201-2RS.

Swing arm 14 includes arm portion 58 and cylindrical sleeve portion 60. A first sleeve 56 is provided below bearing 52 to locate bearing 52 on the bearing journal of shaft 18. Within cylindrical sleeve portion 60 are two bearings 64 which are also press fit onto lesser diameter portion 46 of shaft 18 and whose axial movement is restrained by retaining rings 66. These bearings are typically General Bearing Part No. 6001-2RS. A second sleeve 68 is positioned below bearings 64 followed by bearing 70, which is identical to bearings 64, also press fit onto shaft 18.

The recommended shaft fillet radius for bearings 64 and 70 as specified by the manufacturer is a maximum of 0.012 inches. The fillet radius for shaft 18 in conventional swing arm bracket assembly 10 is typically 0.018±0.002 inches.

Bearing 74 is press fit onto greater diameter portion 48 of shaft 18 and is typically General Bearing Part No. R10-2RS. Bracket 12 provides a bearing bore 72 for positioning bearing 74 therein and axial movement of the bearing is restrained by retaining rings 76.

In operation, it has been found that the above-described conventional swing arm bracket assembly suffers from significant disadvantages. In particular, the swing arm bracket assembly requires five bearing press fits over long lengths of shaft. Such operations increase the potential for shaft bending during assembly.

Additionally, the shaft is rotatably supported between the bearings located in bearing bore 54 in top plate 16 and bearing bore 72 in bracket 12. These bearing bores must therefore be line bored and the parts maintained in true alignment. Accordingly, hardened straight pins must be utilized.

Further, the conventional swing arm bracket assembly is overly complex to assemble. Three different size bearings are used and the numerous snap rings inhibit assembly and disassembly of the structure.

Still further, the shaft fillet radius exceeds the recommended bearing design fillet radius which decreases the bearing internal clearance resulting in premature bearing failure.

There is therefore a need in the art for a swing arm bracket assembly which is more durable and which more readily facilitates assembly and maintenance.

SUMMARY OF THE INVENTION

With the foregoing in mind, it is an object of the invention to provide a swing arm bracket assembly that is more efficient and durable in design and operation.

The swing arm bracket assembly in accordance with the invention includes a shaft having a plurality of journals. One end of the shaft connects to a motor drive shaft. Each journal of the shaft has a bearing thereon and is of approximately the same axial length as the bearing. A support member is provided which connects on one end to a machine and on the other end connects to the motor. The support member also rotatably engages at least one of the bearings on the shaft. A swing arm is provided having an arm portion and a cylindrical sleeve portion extending axially through the support member. The cylindrical sleeve portion rotatably engages at least one of the bearings on the shaft.

BRIEF DESCRIPTION OF THE DRAWINGS

The accompanying drawings, referred to herein and constituting a part hereof, illustrate a preferred embodiment of the invention and, together with the description, serve to explain the principles of the invention, wherein.

DETAILED DESCRIPTION OF THE INVENTION

Figure 1:
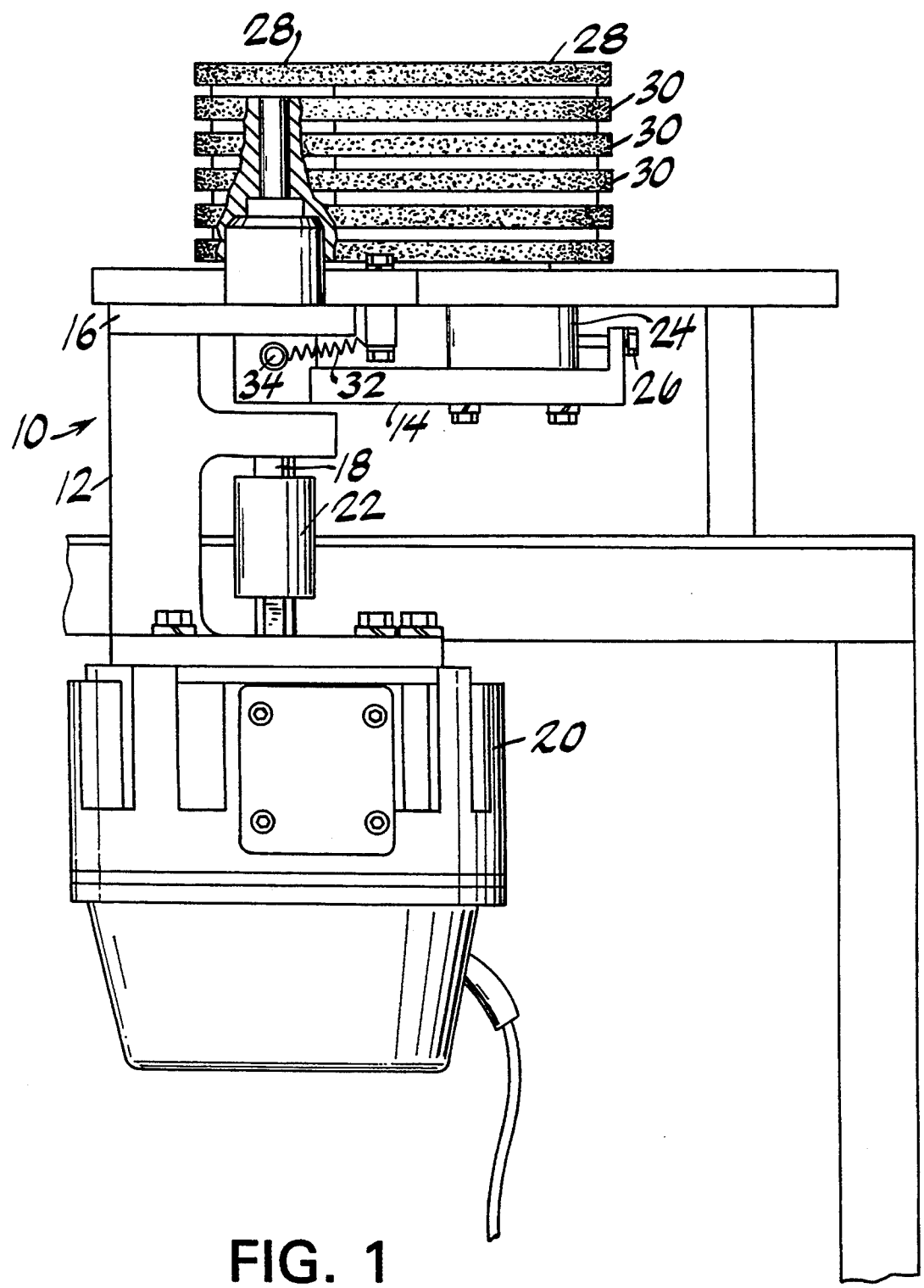
FIG. 1 is a partial sectional view of a letter sorting machine with a conventional swing arm bracket assembly.
Figure 2:
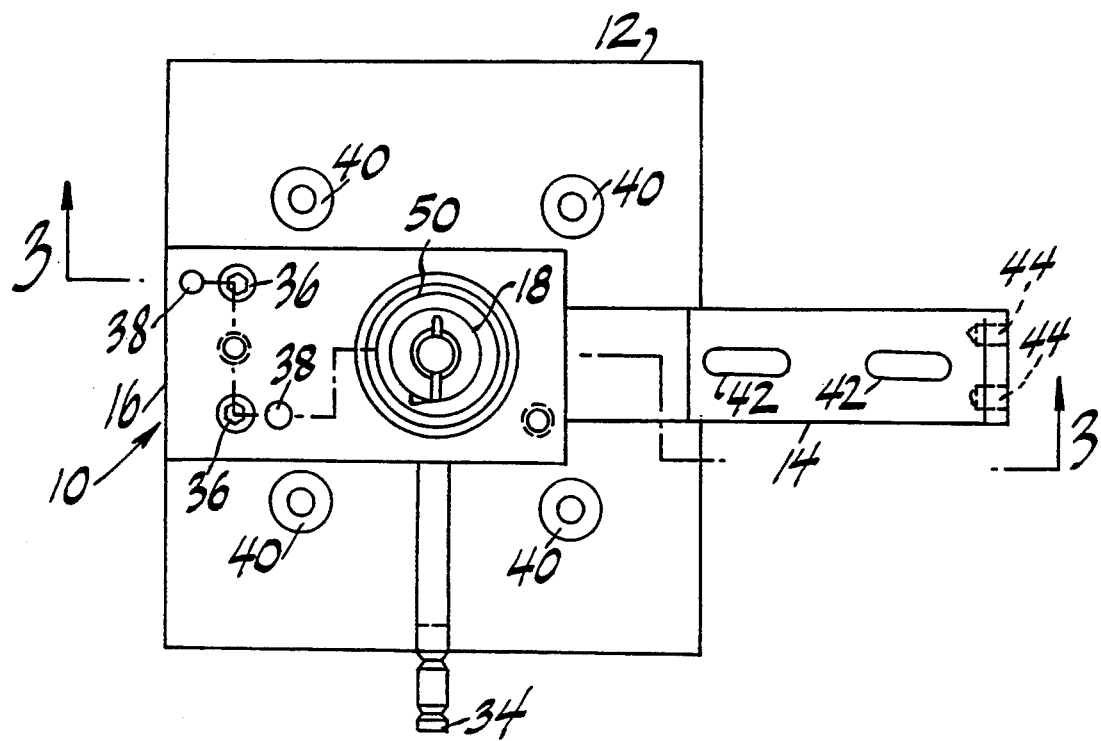
FIG. 2 is a top view of a conventional swing arm bracket assembly.
Figure 3:
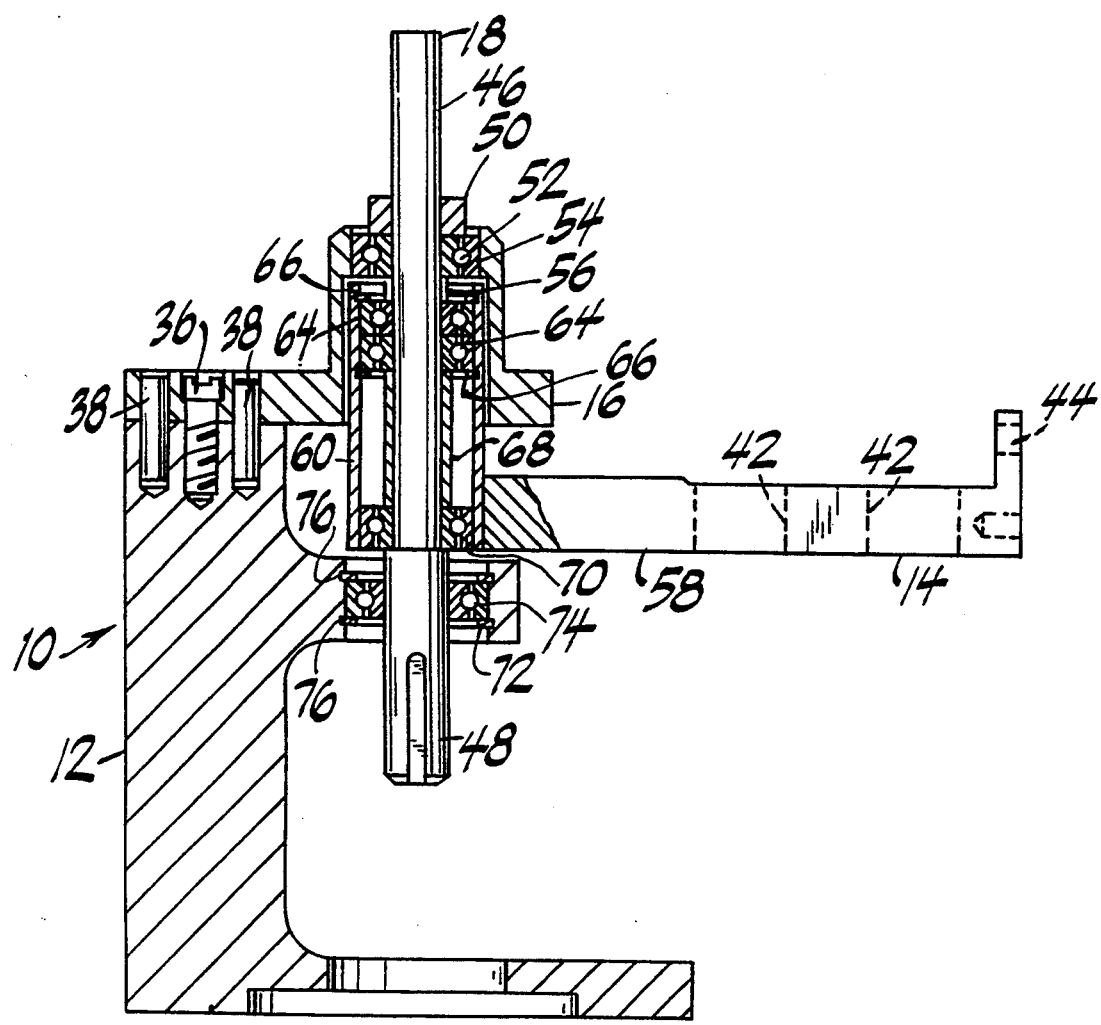
FIG. 3 is a partial side sectional view of the conventional swing arm bracket assembly of FIG. 2 taken along line 3—3.
Figure 4:
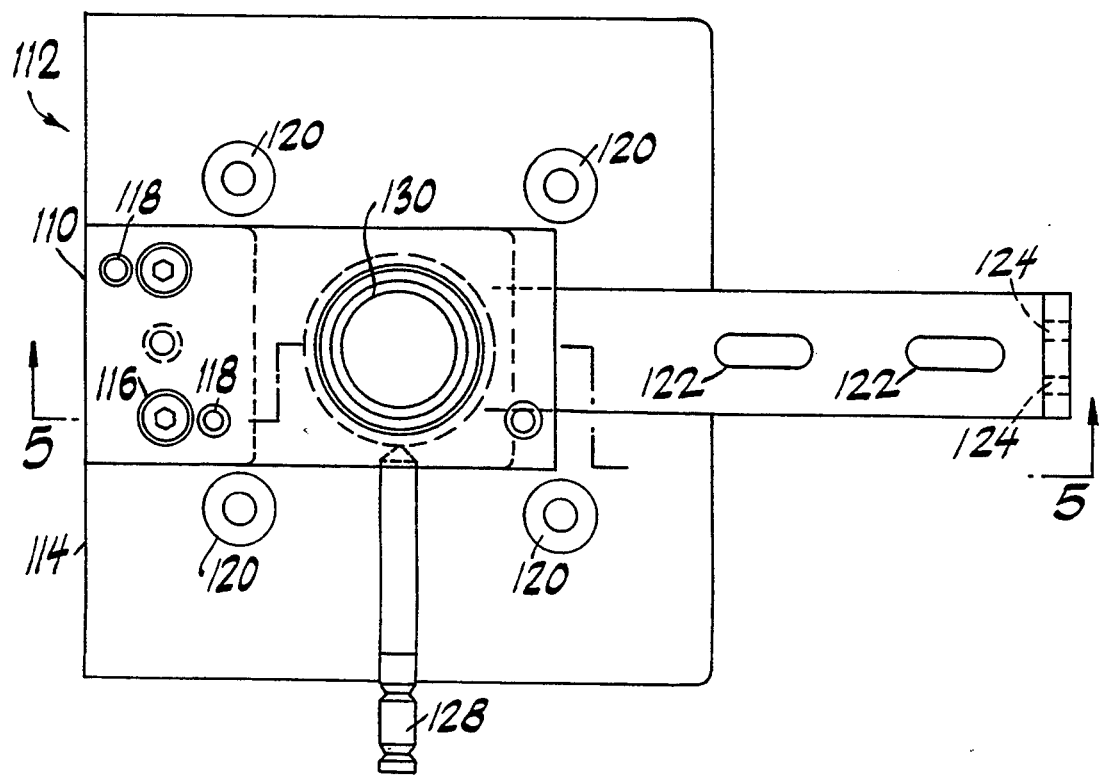
FIG. 4 is a top view of a swing arm bracket assembly in accordance with the invention.

FIG. 4 is a top view of a swing arm bracket assembly in accordance with the invention. Top plate 110 of swing arm bracket assembly 112 is attached to bracket 114 by socket screws 116. Socket screws 116 are recessed into top plate 110 to provide a flush surface for machine mounting and roll pins 118 are provided to align top plate 110 with bracket 114. Mounting holes 120 are provided in bracket 114 for attachment of a servo motor. Oblong holes 122 and through holes 124 are provided on swing arm 126 for attachment and positioning of an idler shaft support. Spring post 128 is provided for attachment of a helical extension spring.

Figure 5:
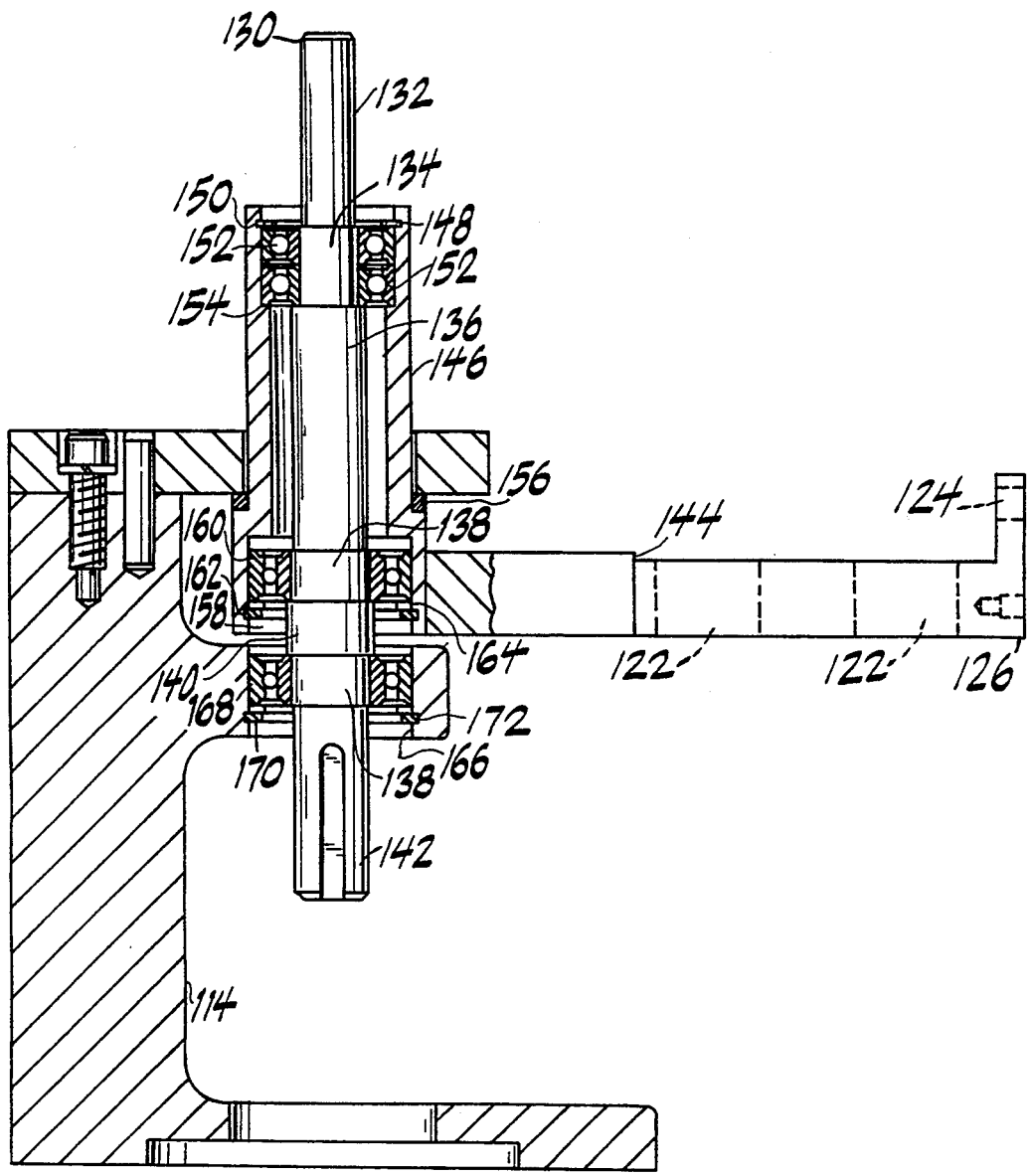
FIG. 5 is a partial side sectional view of the swing arm bracket assembly of FIG. 4 taken along line 5—5.

FIG. 5 is a partial side sectional view of the swing arm bracket assembly in accordance with the invention. Shaft 130 provides first, second, third, fourth, fifth and sixth diameter portions 132,134, 136, 138, 140 and 142, respectively. Swing arm 126 includes arm portion 144 and cylindrical sleeve portion 146. At the top of cylindrical sleeve portion 146 is provided internal recess 148 which is adapted to receive retaining ring 150 therein. Retaining ring 150 serves to restrain axial movement of the bearing, and correspondingly the shaft, in the swing arm bracket assembly. Below retaining ring 150 are provided two roller bearings 152 which rest against internal chamfer 154. These bearings may be, e.g., Fafnir Bearing Part No. PS5PPFS5000 and are press fit onto shaft 130 at second diameter portion 134 and seated against the shoulder of larger diameter portion 136 of shaft 130. The recommended shoulder for bearings 152 as specified by the manufacturer is 0.61-0.63 inches in diameter. The recommended fillet radius is a maximum of 0.016 inches. In accordance with these specifications, the shoulder provided by third diameter portion 136 of shaft 130 is 0.625 inches and the fillet radius is 0.010±0.005 inches.

Provided on the outside of cylindrical sleeve portion 146 below top plate 110 is thrust washer 156. At the bottom of cylindrical sleeve portion 146 of swing arm 126 is provided a second bearing bore 158 having roller bearing 160 therein. Roller bearing 160 may be, e.g., Fafnir Bearing Part No. 9103PP. Bearing 160 is press fit on fourth diameter portion 138 of shaft 130 and is seated against the shoulder of the larger fifth diameter portion 140 of the shaft. Axial movement of the bearing is restrained on the bottom by retaining ring 162 and bearing preload springwasher 164. It may be noted that the upper side of bearing 160 is not directly restrained within the bearing bore 158.

Bearing 168 is press fit on the other of the two fourth diameter portions 138 of shaft 130 and is seated against the shoulder formed by larger fifth diameter portion 140 of the shaft. Bearing 168 is preferably identical to bearing 160. The recommended shoulder for bearings 160 and 168 as specified by the manufacturer is 0.75-0.81 inches in diameter. The recommended fillet radius is a maximum of 0.012 inches. In accordance with these specifications, the shoulder provided by fifth diameter portion 140 of shaft 130 is 0.75 inches and the fillet radius is 0.010±0.005 inches. Bracket 114 similarly provides bearing bore 166 having roller bearing 168 therein. Axial movement of bearing 168 is restrained on the bottom by retaining ring 170 and bearing preload washer 172. As with bearing 160, axial movement is not directly restrained on the top side of bearing 168.

It may be appreciated that the swing arm bracket assembly in accordance with the invention provides significant and distinct advantages over the conventional swing arm bracket assembly deriving particularly from the improved bearing arrangement, including: (1) increased system life; (2) simplification of the assembly process; (3) reduced parts count; (4) reduced critical machining operations; (5) provision of necessary preload on bearings to increase life; and (6) larger shaft for increased strength and system life.

In particular, in comparison to the conventional swing arm bracket assembly, the swing arm bracket assembly according to the invention has no top bearing, the bearing that would most critically see angular deflection of the shaft. Additionally, the bearing span in the swing arm sleeve is increased so as to reduce the side load per bearing.

The conventional swing arm bracket assembly has five bearing press fits over long lengths of shaft. The swing arm bracket assembly according to the invention, because of its larger bearings, allows the bearings to be pressed for only the length of the bearing journal. Short press fits simplify assembly and also reduce the potential for shaft bending during assembly.

The conventional swing arm bracket assembly provides too large a fillet radius. The swing arm bracket assembly according to the invention is in accordance with bearing manufacturer recommendations and the fillets provided therein result in less axial tolerance build up which reduces internal bearing stress.

Roll pins are used instead of hardened straight pins, since the swing arm bracket assembly according to the invention does not require a precise line bore. The use of roll pins also eliminates reaming operations. Elimination of several bearing snap rings provides for ease of disassembly and aids in subassembly replacement and repair of the swing arm bracket assembly.

It may be further appreciated that the swing arm bracket assembly according to the invention utilizes only two different size bearings instead of three as in the conventional arrangement to reduce the parts count. Also eliminated are two spacers, one collar and the top plate bearing support.

The conventional swing arm bracket assembly does not provide for recommended bearing manufacturing preload. This is known to reduce bearing life. The swing arm bracket assembly according to the invention provides proper preload for all bearings.

While the invention has been described in its preferred embodiment, it is to be understood that the words which have been used are words of description, rather than limitation, and that changes may be made within the purview of the appended claims without departing from the true scope and spirit of the invention in its broader aspects.

What is claimed:

1. A swing arm bracket assembly for a machine, comprising:
   (a) a shaft having a plurality of journals with a plurality of bearings thereon and adapted on one end to connect to a drive shaft of a motor, each of said journals and the bearing thereon being of approximately the same axial length;
   (b) a support member adapted on one end to connect to the machine and on the other end to connect to the motor, said support member adapted to rotatably engage at least one of said bearings on said shaft; and
   (c) a swing arm having an arm and a cylindrical sleeve extending axially through said support member, said cylindrical sleeve adapted to rotatably engage at least one of said bearings on said shaft
   wherein each of said plurality of journals of said shaft has an associated shoulder for axial location of the bearing thereon.

2. A swing arm bracket assembly for a machine in accordance with claim 1, further comprising means for applying a preload to each of said plurality of bearings.

3. A swing arm bracket assembly for a machine in accordance with claim 2, wherein said means for applying a preload is a springwasher.

4. A swing arm bracket assembly for a machine in accordance with claim 1, wherein said shaft includes portions of differing diameters, those portions of larger diameter providing a shoulder of sufficient radial height for seating said bearings.

5. A swing arm bracket assembly for a machine in accordance with claim 1, further comprising means for spacing said swing arm from said support member.

6. A swing arm bracket assembly for a machine in accordance with claim 5, wherein said means for spacing is a thrust washer.

7. A swing arm bracket assembly for a machine in accordance with claim 1, wherein said cylindrical sleeve rotatably engages at least one of said bearings on said shaft at each end of said cylindrical sleeve.

* * * * *